UNITED STATES PATENT OFFICE.

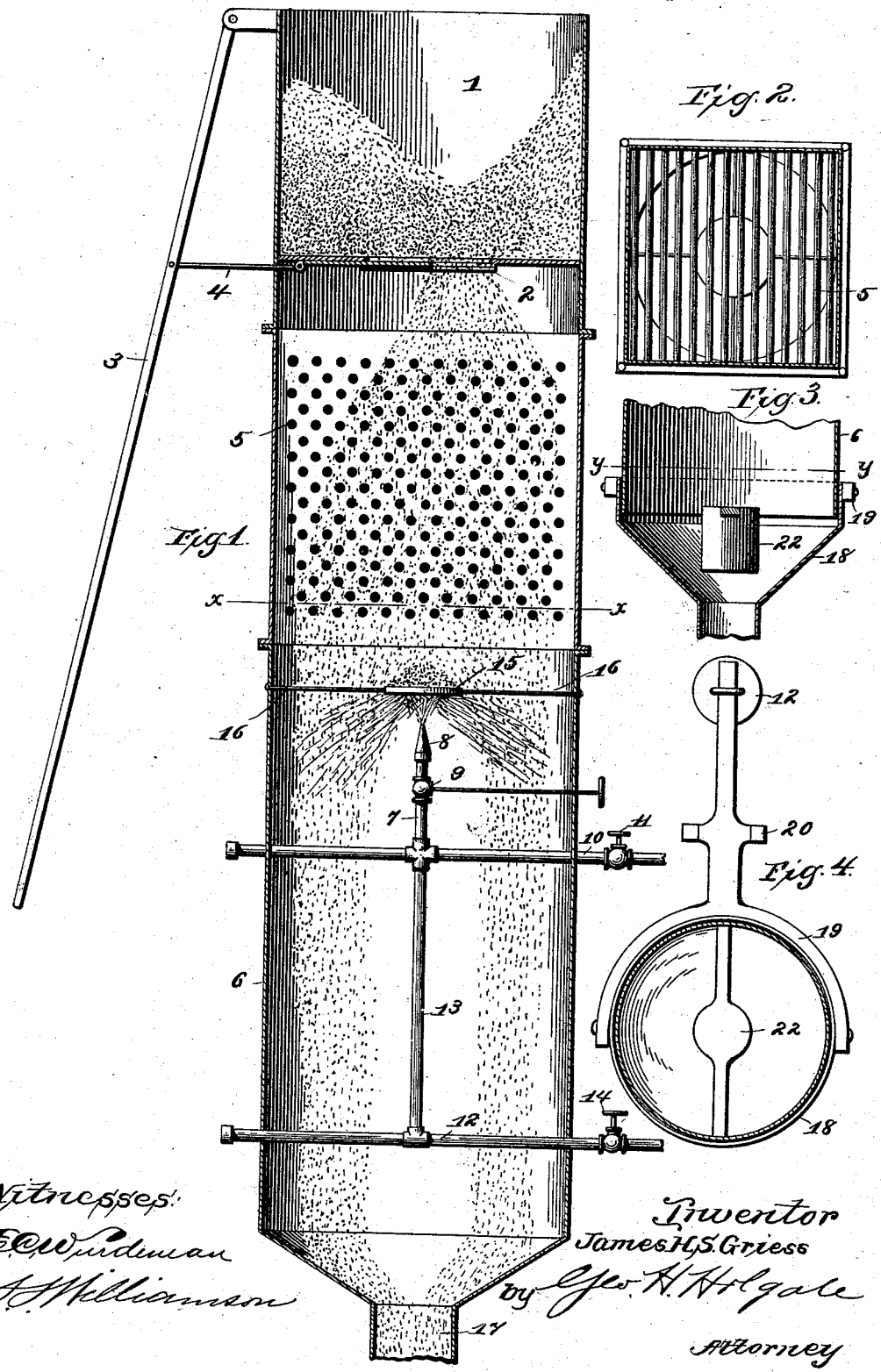

JAMES H. S. GRIESS, OF POTTSTOWN, PENNSYLVANIA.

GRAIN-STEAMER.

SPECIFICATION forming part of Letters Patent No. 558,065, dated April 14, 1896.

Application filed August 8, 1895. Serial No. 558,622. (No model.)

*To all whom it may concern:*

Be it known that I, JAMES H. S. GRIESS, a citizen of the United States, residing at Pottstown, in the county of Montgomery and State of Pennsylvania, have invented certain new and useful Improvements in Grain-Steamers, of which the following is a specification.

My invention relates to a new and useful improvement in steaming grain preparatory to grinding, and has for its object to produce a simple and cheap device for this purpose which will effectually steam grain for the purpose of adding moisture thereto.

With this end in view the invention consists in the details of construction and combination of elements hereinafter set forth, and then specifically designated by the claim.

In order that those skilled in the art to which my invention appertains may understand how to make and use the same, I will describe its construction and operation in detail, referring by number to the accompanying drawings, forming a part of this specification, and in which—

Figure 1 is a central vertical section of my improved device; Fig. 2, a section at the line *x x* of Fig. 1; Fig. 3, a slight modification of the lower end of the steam-chamber, and Fig. 4 is a section at the line *y y* of Fig. 3.

Similar numbers denote like parts in all the views of the drawings.

1 is a hopper, into which the grain to be steamed is placed by any convenient means, and the bottom of this hopper is provided with a slide 2, controlled by the lever 3 and connecting-rod 4. Next below this hopper is a compartment provided with a number of deflecting-rods 5, placed horizontally across the compartment, so as to scatter and thoroughly distribute the grain passing from the hopper to the steaming-chamber 6, as clearly shown in Fig. 1.

7 is a steam-pipe, having a nozzle 8 at its upper end and provided with a valve 9, by which the flow of steam through this nozzle may be regulated, and 10 is a feed-pipe leading from the steam source to the pipe 7 and provided with a valve 11.

12 is a drain-pipe connected with a downward extension 13 of the pipe 7 and provided with a valve 14 for drawing off the waters of condensation from the pipes.

15 is a baffle-plate, preferably in the form of a disk and suspended in the center of the steam-chamber by the rods 16, so that it will be seen that as the steam flows through the nozzle it will strike against this plate and be diffused in all directions, completely filling the steam-chamber, and as the grain descends through this chamber it will absorb the steam therein and finally pass out the discharge-pipe 17, from whence it may be elevated and conveyed to the grinders.

In practice it is found that to facilitate the separation of the bran from hard wheat it is essential to temper said wheat by moisture before grinding it, for if this hard wheat be reduced without moisture the dry bran would be broken into fine bits on the rollers and the separation of the same become a matter of considerable difficulty; but by tempering the grain through the application of moisture the breaking or subdivision of the bran may be avoided. On the first squeeze of the rolls the bran will split and leave the grain in two parts, the same being of such size that they are readily separated from the rest of the stalk, and as my device accomplishes this result of moistening the grain to a sufficient degree, which is determined by the amount of steam-flow and grain fed through the steam-chamber, it will be seen that considerable advantage is gained, and as there are no complicated parts to be operated, which are likely to become disarranged and refuse to work, the device is well adapted for use in connection with all classes of milling.

In Figs. 3 and 4 I have shown a modification that contemplates regulating the outflow of the grain from the steam-chamber, and this is accomplished by providing a sliding bottom 18 at the lower end of the steam-chamber and connecting this bottom to a yoke 19, which is pivoted at 20 and counterbalanced by a weight 21. 22 is a plug supported within this bottom, having its lower end in close proximity to the tapering walls thereof, so that should the grain become clogged and increased this bottom will be lowered by the overbalancing of the weight 21 and the distance between the lower edges of the plug and the slanting of the walls of the bottom increased, which will permit the grain to flow more freely.

Having thus fully described my invention, what I claim as new and useful is—

In a device of the character described, a hopper having a sliding bottom, a lever and a suitable connecting-rod for operating the same, a compartment below the hopper, a series of horizontal deflecting-rods arranged thereon, a steaming-chamber below the compartment, a baffle-plate suspended centrally of the steam-chamber and a steam-supply pipe having a nozzle provided with a valve 9, a sliding bottom in the lower end of the steam-chamber, a pivotal yoke connected with the bottom, a plug supported within the bottom and a weight on the yoke, as and for the purpose described.

In testimony whereof I have hereunto affixed my signature in the presence of two subscribing witnesses.

JAMES H. S. GRIESS.

Witnesses:
JOHN A. WEBER,
JAMES SANDS.